United States Patent
Chrisman et al.

(12) 
(10) Patent No.: US 6,516,973 B2
(45) Date of Patent: Feb. 11, 2003

(54) DEVICE FOR DISPENSING A FLOWABLE POWDER SUBSTANCE

(75) Inventors: Randall C. Chrisman, Southbury, CT (US); Jose Antonio Gutierrez, Kent, CT (US); Don G. Melanson, Southbury, CT (US); William F. Overbaugh, Lakeside, CT (US); Gerhard Ufheil, New Milford, CT (US)

(73) Assignee: Nestec S.A., Vevey (CH)

( * ) Notice: Subject to any disclaimer, the term of this patent is extended or adjusted under 35 U.S.C. 154(b) by 120 days.

(21) Appl. No.: 09/825,744

(22) Filed: Apr. 4, 2001

(65) Prior Publication Data

US 2002/0145013 A1 Oct. 10, 2002

(51) Int. Cl.[7] ................................................ B67B 5/00
(52) U.S. Cl. ................................. 222/153.14; 222/561
(58) Field of Search ........................... 222/153.14, 561, 222/413

(56) References Cited

U.S. PATENT DOCUMENTS

| | | | |
|---|---|---|---|
| 2,558,522 A | | 2/1945 | Knapp ........................... 225/21 |
| 2,601,353 A | * | 6/1952 | Woodward .................... 222/561 |
| 4,331,266 A | | 5/1982 | Bond ............................ 222/107 |
| 4,466,559 A | | 8/1984 | Loader .......................... 222/196 |
| 5,104,002 A | | 4/1992 | Cahlander et al. .............. 222/1 |
| 5,152,428 A | | 10/1992 | Di Gerolamo ................ 222/80 |
| 5,237,910 A | | 8/1993 | Chigira ......................... 99/282 |
| 5,839,610 A | | 11/1998 | Reese et al. ................ 222/129.3 |
| 5,997,236 A | | 12/1999 | Picioccio et al. ............ 414/403 |
| 6,006,657 A | | 12/1999 | Ikuta ........................... 222/105 |
| 6,056,157 A | | 5/2000 | Gehl et al. ................... 222/105 |
| 6,250,506 B1 | | 6/2001 | Geiger et al. ................ 222/105 |

FOREIGN PATENT DOCUMENTS

| | | |
|---|---|---|
| CH | 594 840 | 1/1978 |
| EP | 0 434 168 A2 | 6/1991 |
| EP | 0 516 168 A2 | 12/1992 |
| EP | 1 089 240 A2 | 4/2001 |
| GB | 1 325 478 | 8/1973 |
| JP | 11149587 | 6/1999 |
| JP | 2000081777 | 3/2000 |
| WO | WO 96/35635 | 11/1996 |

* cited by examiner

Primary Examiner—Philippe Derakshani
(74) Attorney, Agent, or Firm—Winston & Strawn

(57) ABSTRACT

The invention relates to a container assembly of a container containing a flowable substance; a container holding assembly attached to the container which comprises an opening mechanism for selectively opening the container and being adapted to move from a closed position to an open position of the container and vice versa, and a locking mechanism for holding the opening means in a closed position of the container. The locking mechanism is intended to be released by the release member of a reservoir assembly arranged so that release is effected when the container holding assembly is held in a stable delivery position on a reservoir. The invention also relates to the combination of such a container assembly and a reservoir assembly specially adapted for receiving the container assembly.

40 Claims, 8 Drawing Sheets

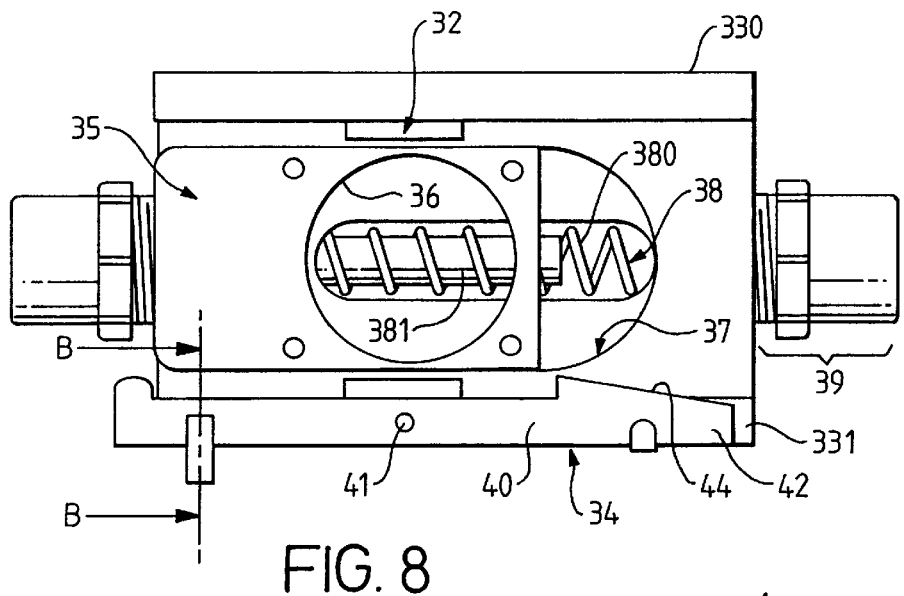
FIG. 8
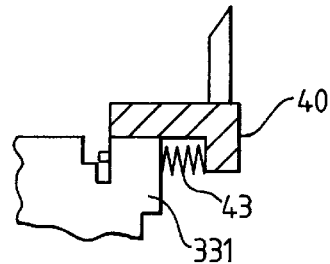
FIG. 8A
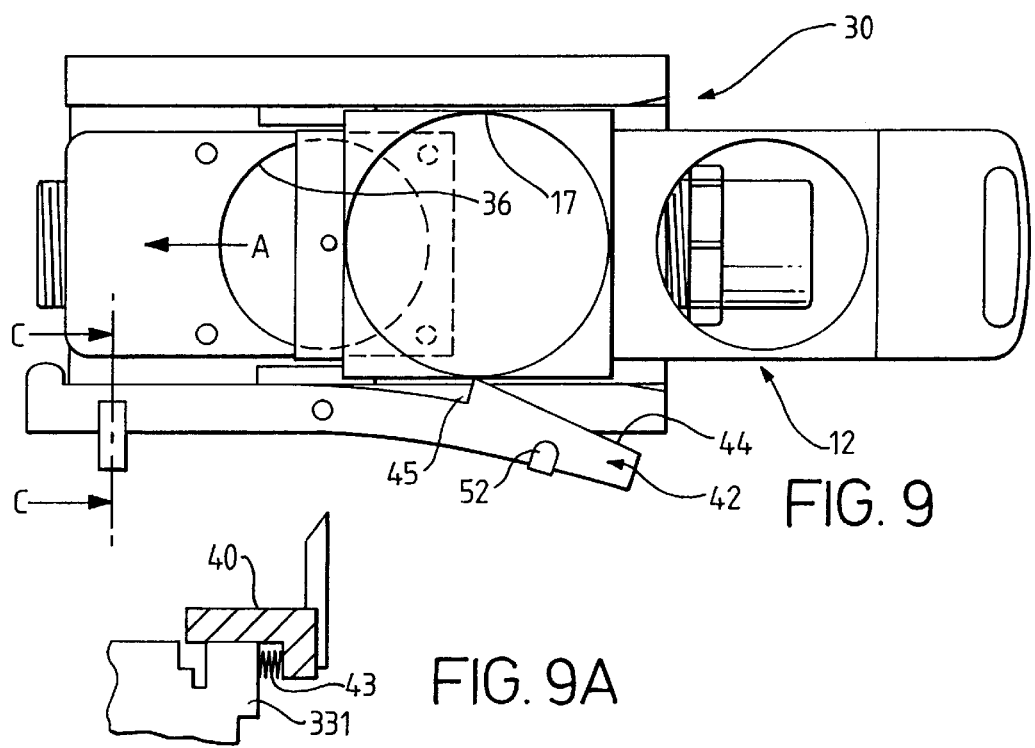
FIG. 9
FIG. 9A

DEVICE FOR DISPENSING A FLOWABLE POWDER SUBSTANCE

FIELD OF THE INVENTION

The present invention generally relates to a device for dispensing a flowable substance, and in particular to a device for dispensing powder used for preparing a beverage from a beverage machine such as a coffee machine and the like. The invention also relates to a container assembly adapted to such a device.

BACKGROUND

Various automated beverage machines for making hot or cold beverage products are known in the art. In a conventional beverage machine, a metered amount of water-soluble beverage powder, stored in powder refillable canister, and a metered amount of hot or cold water, supplied from a water source, is conveyed into a mixing chamber to produce a beverage or food, which is then dispensed into a cup and served. The refilling of canisters requires time consuming manual operations from the foodservice operator. The operator has usually to refill the canisters by pouring the powder from powder bags. This can cause significant loss of powder and hygienic problems due to possible contamination with the outside environment, especially, when air and water sensitive powders are used such as milk powders. Periodical cleaning of the machine is also rendered necessary to avoid the machine looking dirty and also to avoid hygiene hazards.

Another problem associated with the dispensing of dry and powdered material from a canister is that such a material is hygroscopic and therefore has very high tendency to form lumps and cakes that might affect the accuracy of the metered dosage of the powder from the machine.

Therefore, there does not exist a satisfactory device, especially for use as a small coffee machine for an office or home coffee system, that would allow the reliable dispensing of powder from a convenient removable package with a high level of cleanliness, convenience and reliability. In particular, there does not exist a device that would provide a substance-containing package that can be adapted in a quick, clean and effective manner to a reservoir and dosing device with the package forming a part of the reservoir. Such a configuration would allow more flexibility in the way the beverage-making machines can be conceived as the reserve of powder would not necessarily be fully part of the machine itself. The present invention now resolves these deficiencies.

SUMMARY OF THE INVENTION

The present invention provides a device for dispensing a flowable substance, especially a dry powdered food material, which can be more cleanly and rapidly refilled with powder while necessitating less labor time. More specifically, this dispensing device ensures essentially no loss of the flowable substance, reduces cleaning requirements to a minimum and consequently diminishes the risks of potential hygienic hazards. In addition, this dispensing device may be adapted for various applications such as home or office beverage-making systems of relatively small or reduced volumes.

The invention specifically relates to a dispensing device comprising a container holding assembly adapted for receiving a container having a flowable substance therein. The container holding assembly has opening means for selectively opening said container which is adapted to move from a closed position to an open position of the container and vice versa. The container holding assembly further has a locking means for holding the opening means in an initially closed position of the container. The dispensing device further comprises a reservoir means adapted to receive the container holding assembly for being delivered with flowable substance in a delivery position and latch means for securing the container holding assembly to the reservoir means when the container is in the delivery position. The reservoir means further comprises a release means for releasing the locking means of the container holding assembly. The release means may be coupled to the latch means. The release means is capable of actuating the locking means of the container holding assembly when the container is secured in the delivery position so that the opening means of the container holding assembly is capable of being moved from its closed position into an open position to free flowable substance from the container that can flow into the reservoir means.

In a preferred aspect, the device further comprises a secondary locking means for locking the latch means attaching the container holding assembly to the reservoir means in the delivery position of the container which is arranged with respect to the opening means of the container assembly so that it deactivates selectively the latch means to enable to release the container assembly only when the opening means is moved into a closed position of the container so that any excess of substance can be prevented from flowing outside of the container when disengaging the container assembly from the reservoir means. More especially, it allows to remove the container in a clean way before the container is fully empty.

In a preferred embodiment, the container holding assembly comprises primary sliding means adapted to move the opening means with respect to the container from a closed position to an opening position and vice versa.

In addition, the container holding assembly may be guided in sliding engagement onto the reservoir means by secondary sliding engaging means including stopping means capable of stopping the container in the predetermined delivery position.

Therefore, according to a preferred aspect, the primary and secondary sliding means lies in the same direction so that the engagement of the container assembly and the opening of the container can be carried out one after the other along a substantially continuous sliding motion. Therefore, the container can be properly and rapidly opened in the suitable position to the reservoir means.

In a preferred embodiment, the opening means and primary sliding means form a gate plate slidably engaging a container carriage onto which the container may be attached. Preferably, the container is removably attached to the container carriage by removable connection means. Alternatively, the container may be permanently attached to the container carriage. The container carriage may include a first part of the secondary sliding means adapted to complement a second part of the secondary sliding means of the reservoir means. The gate plate and the container carriage may both be provided with openings for the passage of the flowable substance that coincide together when the container assembly is moved in opening position on the reservoir means.

The reservoir means may comprise a passage for collecting the flowable substance that extends beyond the openings of the container assembly so that any excess of powder may be wiped from the gate plate during the closure of the gate plate with respect to the container carriage and collected through the passage. This configuration is effective to prevent substance from soiling the vicinity of the reservoir means but ensures the excess of powder can fall back into the reservoir means as the opening means is returned in the closed position.

In another important aspect of the invention, the invention relates to the container assembly itself as taken as an independent part in relation to the reservoir means. For that, the container assembly comprises a container containing a flowable substance and a container holding assembly attached to the container which comprises an opening means for selectively opening the container adapted to move from a closed position to an open position of the container and vice versa, and locking means for holding the opening means in the closed position in which the container is closed by the container holding assembly. The locking means may be released by a release means of a reservoir assembly arranged so that the release is effected when the container holding assembly held in a stable delivery position onto the reservoir means.

In another aspect, the invention relates to a device for dispensing a flowable substance comprising a cartridge holder and a hopper. The cartridge holder is adapted for receiving a refill cartridge that contains a flowable substance, and includes an apertured plate member for selectively opening the cartridge. The plate member is adapted to move from a closed position, wherein a portion of the plate member obturates the cartridge, to an open position wherein the plate member leaves the cartridge open and vice versa. The apertured plate member is initially locked to the cartridge in the closed position.

The hopper is adapted to receive the cartridge holder in a delivery position for delivering the flowable substance. The hopper is preferably adapted to release the apertured plate member by the effect of the cartridge holder engaging the hopper in the delivery position such that the cartridge holder is capable of being moved from the closed position to the open position, thereby freeing flowable substance from the cartridge that can flow into the hopper.

The container may include any powdered food material such as a milk or milk based products, soup, sauces, mashed potatoes or other dehydrated food products.

Another aspect of the invention relates to a method for rapidly and cleaningly delivering a powder in a reservoir assembly from a container containing a powder. In this method, a container holder adapted for receiving the container is provided. This container holder comprises an apertured means for selectively opening the container with the apertured means being adapted to move from a closed position wherein a portion of the apertured means obturates the container to an open position wherein the apertured means leaves the container open and vice versa. The apertured means is ordinarily locked to the container in a closed position, and is released as the container holder securely engages the reservoir assembly in a delivery position for delivering the flowable substance from the container.

BRIEF DESCRIPTION OF THE DRAWINGS

Preferred features of the present invention are disclosed in the accompanying drawings, wherein similar references characters denote similar elements throughout the several view, and wherein:

FIG. 8 is a top view of the reservoir assembly of the invention;

FIG. 8A shows a detail taken along line B—B of FIG. 8;

FIG. 9 is a top view of the dispensing device at the time the container holder is engaging the reservoir assembly;

FIG. 9A shows a detail taken along line C—C of FIG. 9;

DETAILED DESCRIPTION OF THE PREFERRED EMBODIMENT

Figure 1:
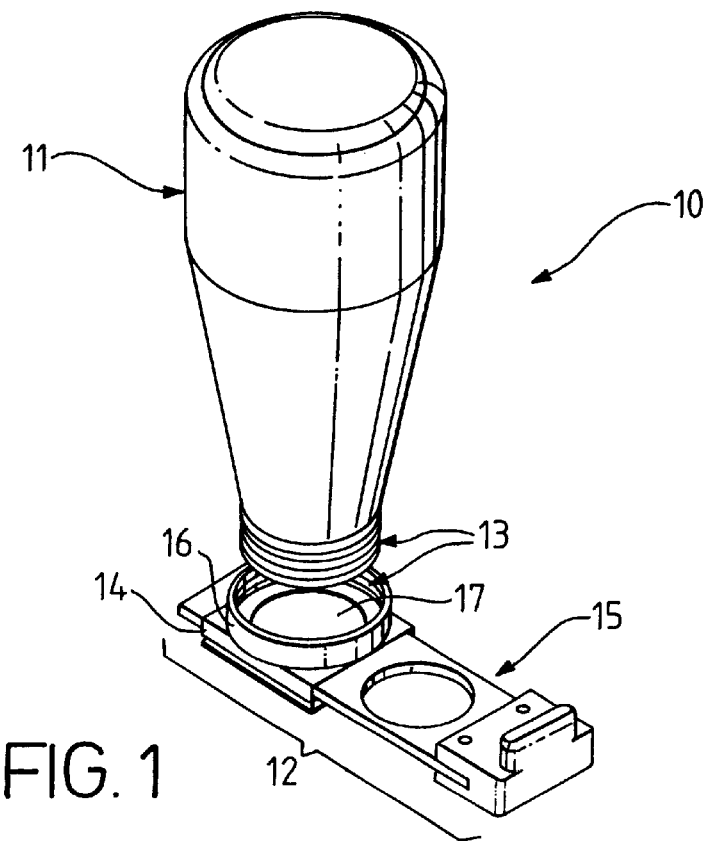
FIG. 1 is a perspective view of a container assembly of the invention with the container removed from the container holder.
Figure 2:
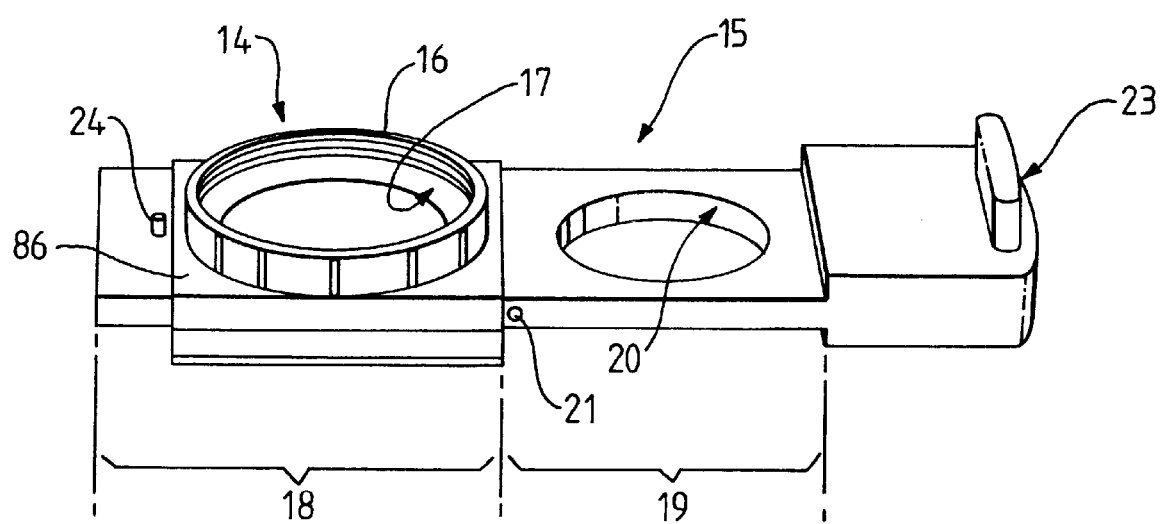
FIG. 2 is a perspective view of the container holder of FIG. 1 without the container.
Figure 3:
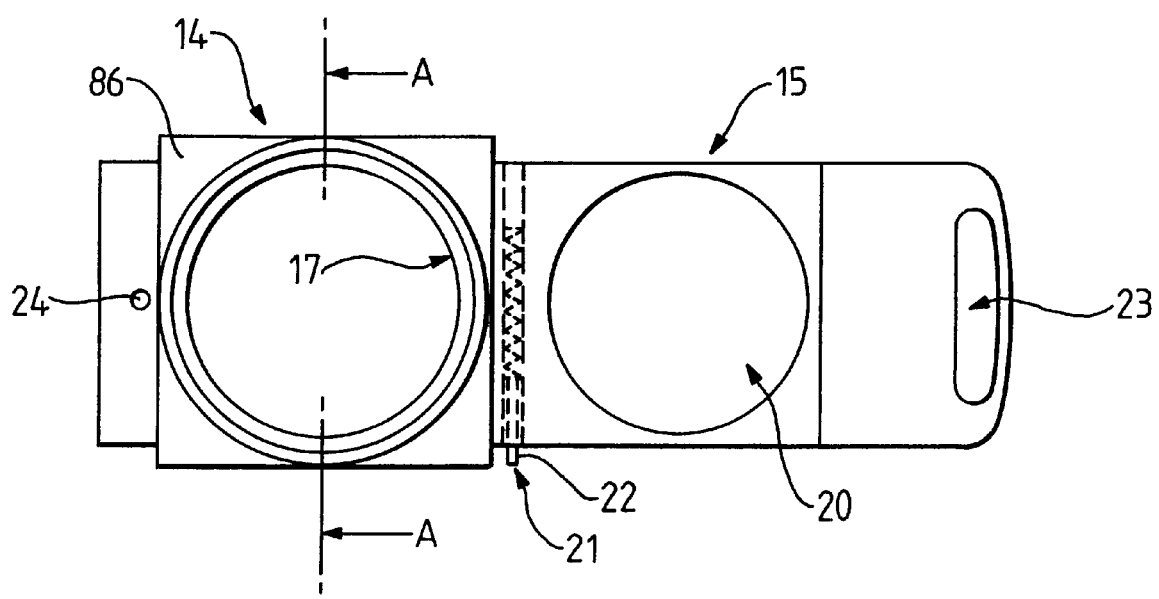
FIG. 3 is a top view of the container holder of FIG. 2.

A preferred embodiment exemplary embodiment of the invention is illustrated in FIGS. 1 to 12 wherein like numerals represent like parts.

Referring to FIGS. 1 to 5, the invention is illustrated as a container assembly 10. The container assembly is comprised of a container 11 and a container holding assembly or "container holder" 12. The container contains a reserve of flowable substance of a capacity adapted to the intended purpose. The flowable substance may preferably be a powdered food or beverage-making component, such as a powder of soluble milk, coffee, cocoa, tea or a combination thereof. Other powdered foods such as dried mashed potatoes or other dried foods, sauce or gravy powders, soup powders or the like way also be used in this invention. The container may be a plastic, glass or metal bottle or canister, although the specific shape and material of the container are not critical.

The container 11 may be either a removable part of the container holder 12 or a permanent part affixed to the container holder. For obvious economical reasons, it is preferred to have the container removably connected to the container holder by any suitable removable connection means such as screw threads 13, a snap-fitting connection or any equivalent connection means or members.

The container holding assembly 12 preferably comprises opening means which allow a selective opening of the container only when the container holding assembly is in full engagement onto a complementary part of a reservoir means as will be explained later in the description. The opening means of assembly 12 comprises a container carriage 14 mounted in sliding relationship onto a gate plate 15. The container carriage includes the complementary parts of the connection means 13 and is adapted for securely retaining the outlet portion of the container. For that, a sufficiently stable and rigid protruding connecting portion 16 of the carriage is provided. Other plate members that are capable of sliding or reciprocating movement are also suitable. An opening 17 is provided in the container carriage 14 through the connecting portion 16. The connecting portion 16 is attached on the support base 86 of the container carriage.

The gate plate 15 is an elongated plate member having mainly two distinct sliding portions along which the carriage may slide. The gate plate 15 comprises a first obturating portion 18 and a second apertured portion 19. The apertured portion has an opening 20 of a size substantially identical to the size of the opening 17 of the carriage.

As the container holding assembly is taken as an independent part of the rest of the dispensing unit, the gate plate is arranged so that the opening 17 of the container carriage is initially closed by the solid obturating or closing portion 18. The container carriage is prevented from slidably moving along the gate plate by a locking means 21 located between the two portions 18, 19 of the gate plate. The locking means 21 may be, for instance, a spring biased pin or finger 22 that protrudes outwardly from a side of the gate plate. The finger is arranged so that it holds the container carriage on a position in which the opening 17 is obturated by the obturating portion 18 of the gate plate. The finger 22 is of sufficiently small size so that it cannot be easily manipulated or compressed by a user. The gate plate further comprises a fixed pin or finger 24 at the other end of the carriage which prevents any significant motion of the carriage along the gate plate. On the other end of the gate plate is provided a handle 23 to permit easy manipulation of the container assembly during the loading operations on the reservoir means as will be further explained herein.

Figure 4:
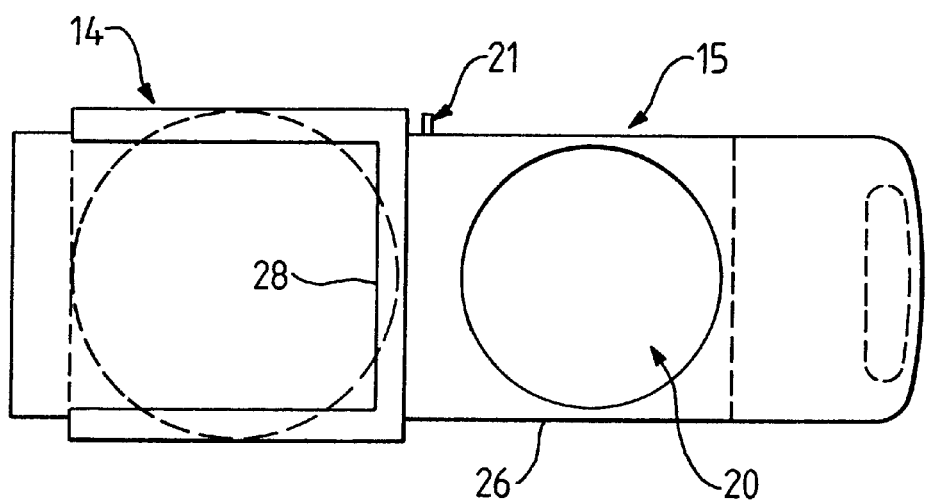
FIG. 4 is a bottom view of the container holder of FIG. 2.
Figure 5:
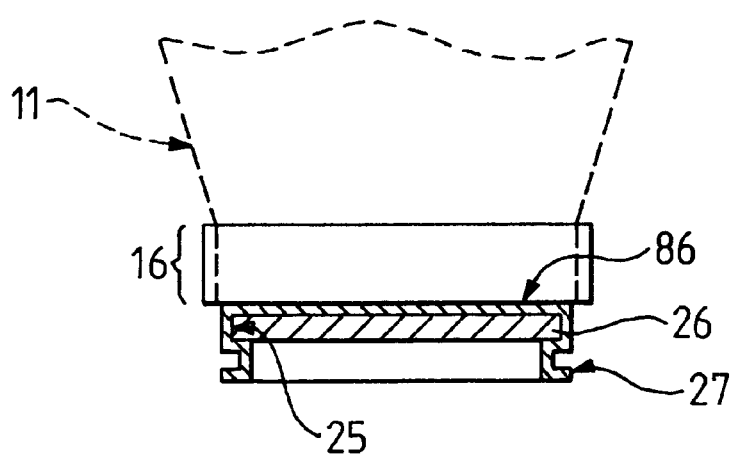
FIG. 5 is a cross-sectional view along line A—A of FIG. 3.

FIGS. 4 and 5 shows details of the construction of the container holding assembly which comprises primary sliding means between the gate plate and the container carriage. More particularly, the carriage is provided with internal side rails 25 adapted for engaging the narrowly shaped sides 26 of the gate plate. The primary sliding means 25, 26 enable the container carriage to move along the gate plate between a closed position to an open position when the locking means 21 is compressed or otherwise disabled.

The container carriage further comprises a first part of secondary sliding means in the form of external side rails 27 that are adapted to guide the carriage onto the reservoir means as it will be further explained. In addition, at the bottom of the carriage is provided a transversal abutting portion 28 which serves as a stopping part of the carriage when engaged in the reservoir means, as it will also be further explained herein.

Figure 6:
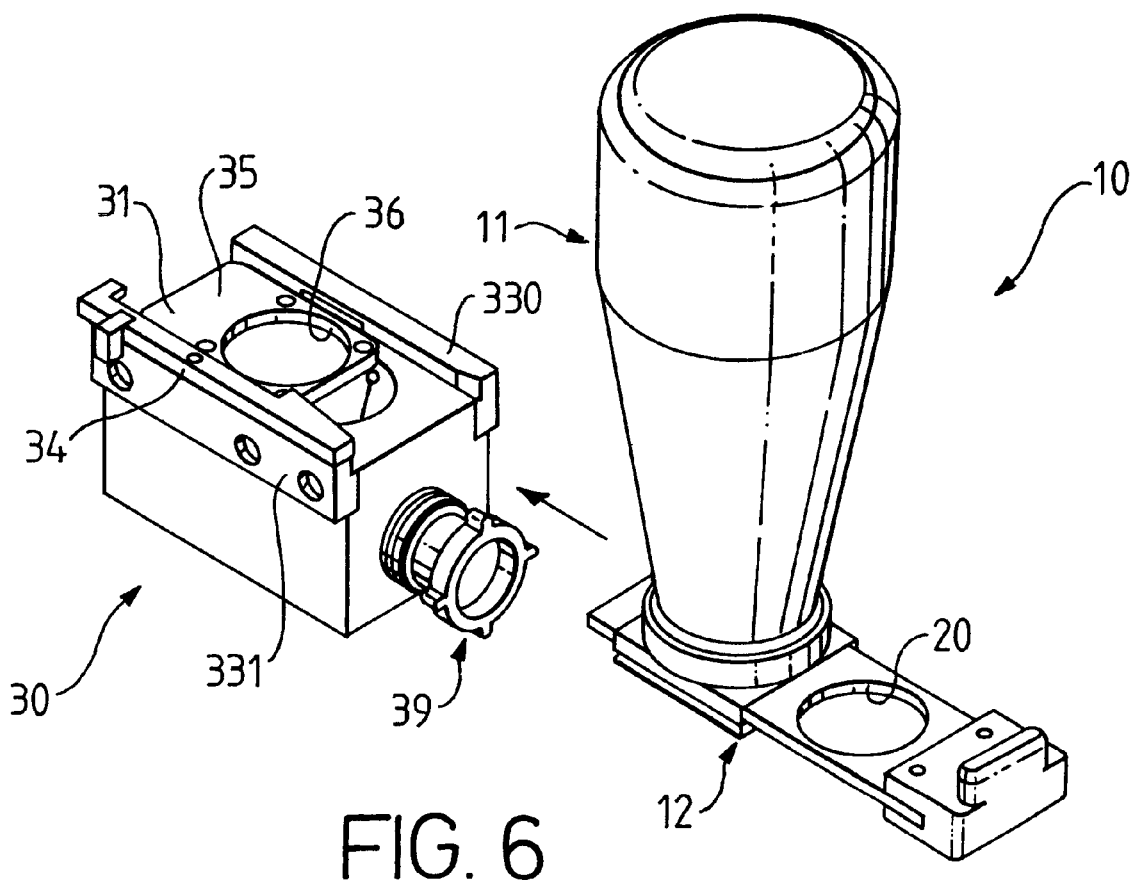
FIG. 6 is a perspective view of a powder-dispensing device of the invention including the container assembly and the reservoir assembly before fitting together.
Figure 7:
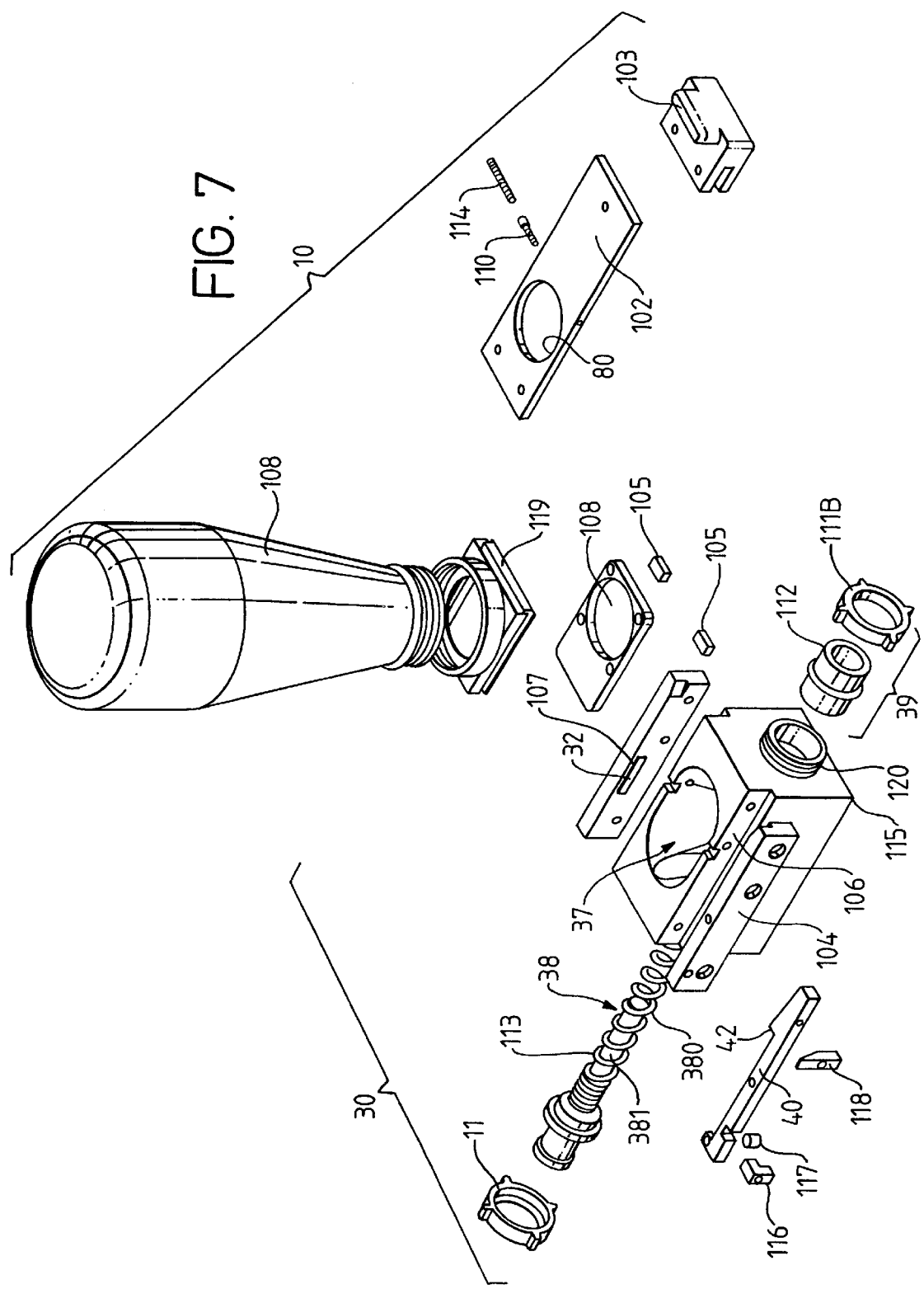
FIG. 7 is a perspective exploded perspective view of FIG. 6 showing the various elements constituting the powder-dispensing device of the invention.

FIGS. 6 and 7 show a device for dispensing a flowable substance of the invention before engagement for dispensing of the substance. The device comprises the container assembly 10 as previously described and a reservoir assembly or hopper device 30 adapted to receive the holder 12 in a suitable delivery position for delivering the flowable substance from the container 10.

The reservoir assembly 30 is intended to be mounted as a permanent part of a more complete beverage-dispensing unit. The reservoir assembly includes a loading area 31 for accommodating the holder 12 in sliding engagement along guiding rails 32 that cooperate in engagement with the external rails 27 of the container carriage. The loading area is further laterally demarcated by upwardly oriented sidewalls 330, 331 that help to guide the sides of the holder 12. Onto one of the sidewalls 331 is mounted a latch mechanism 34 which has the function of securing the holder a the proper delivery position. The loading area has in its central part a hopper insert 35 having the configuration of a plate with an opening 36 of about the same dimensions as the two openings 17, 20 of the holder thereby demarcating the intended delivery position of the device. The hopper insert has sidewalls that provides further guidance for the internal sidewalls in the bottom of the container carriage. The hopper insert thus participates in providing stability of the container holding assembly.

The reservoir assembly further provides a main elongated cavity 37 extending longitudinally along the loading area for collecting the powder that is located below the hopper insert 35. The cavity comprises sloped walls to direct the flow of powder in the bottom. In particular, the cavity may include sloped walls forming an angle of between 15 to 30 degrees, preferably 18 to 23, and more preferably 20 degrees with respect to the direction of gravity. A dosing means 38, preferably a rotary auger or screw driven via an electrically powered motor (not shown), occupies the bottom of the cavity 37. The dosing means is arranged for dosing a pre-metered amount of powder transported by the screw toward an outlet assembly 39 of the reservoir assembly.

FIG. 7 is an exploded view of the component parts that make up the container assembly 10 and reservoir assembly 30. For the container assembly 10, a canister 108 is releasably attached to a bottle carriage 109 by mating threads or by a snap lock connection. Valve slide plate 102 slidingly engages the bottle carriage 109 through passageway 119. After the plate is slid into the passageway, it is secured thereto with bullet 110 and an engagement spring 114 is associated with bullet 110. A valve slide handle 103 is positioned and secured onto the end of the valve slide plate for grasping and movement of that plate.

Reservoir assembly 30 includes housing 115 which includes the elongated cavity 37 and an internal bore which receives auger 113. The auger is secured to a threaded boss on the housing by nut 111A and urges through outlet assembly 39 which includes collar 112 secured to a housing boss 120 by nut 111B.

Hopper insert 101 is secured to housing 115 by side rails 104, 107. A latch mechanism 40, which includes spring 116, space 117 and latch lever 118, has a ramp-shaped latch head 42 which engages the valve slide plate to secure it in the dispensing position.

In reference to FIGS. 8 and 8A, 9 and 9A, the latch mechanism 34 of the reservoir assembly is resiliably connected to the sidewall 331. More particularly, the latch mechanism is comprised by an elongated lever 40 mounted in rotation along axis 41. At one end of the lever is provided a ramp-shaped latch head 42 adapted to both secure the container carriage in place and engage the locking means 21 as will be further explained herein. At the other end of the lever, is provided a spring element 43 that is arranged between sidewall 331 and lever 40 to permanently urge the latch head in closing configuration; i.e., in a direction oriented toward the interior of the loading area. The latch head 42 is shaped in the form of a ramp surface 44 tapering outwardly that allows a smooth opening of the latch mechanism as the holder is loading onto the reservoir assembly. The first surface 44 extends by a second surface 45 forming a hook which secures the container carriage when sufficiently engaged along the loading area; i.e., when in the suitable delivery position in which the openings 17 of the carriage comes above the opening 36 of the hopper insert 35.

Figure 9B:
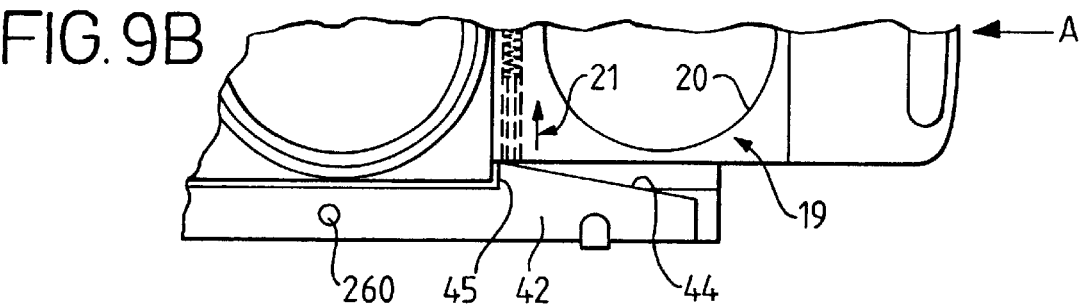
FIG. 9B is a top view of a detail showing the unlocking step actuated by the latch element of the reservoir assembly.
Figure 9C:
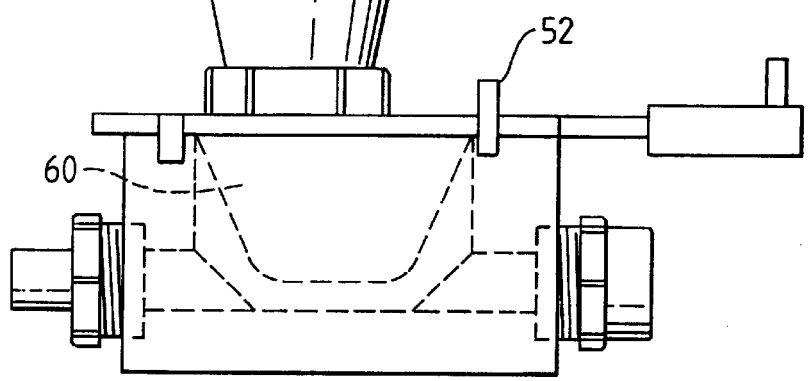
FIG. 9C is a side view of the dispensing device of FIG. 9.

FIGS. 9 and 9A shows the beginning of the loading operation of the container holder 12 onto the reservoir means 30 in which one sidewall of the container carriage exerts a reaction force onto the latch head 42 when engaging along the sidewalls 33 of the loading area. In that configuration, the lever moves backward and its compression spring 43 is compressed (FIG. 9A). For loading of the container holder, the user pushes on the handle 23 in the longitudinal direction of arrow A. Due to the presence of spring-biased locking means 21 protruding from the side of the gate plate 15 to retain the carriage 14, the carriage is held in a closed position and therefore is prevented from sliding along the gate plate 15. The size, shape and capacity of the reservoir means is not critical and any suitable reservoir design can be routinely determined by one of ordinary skill in the art.

Figure 10:
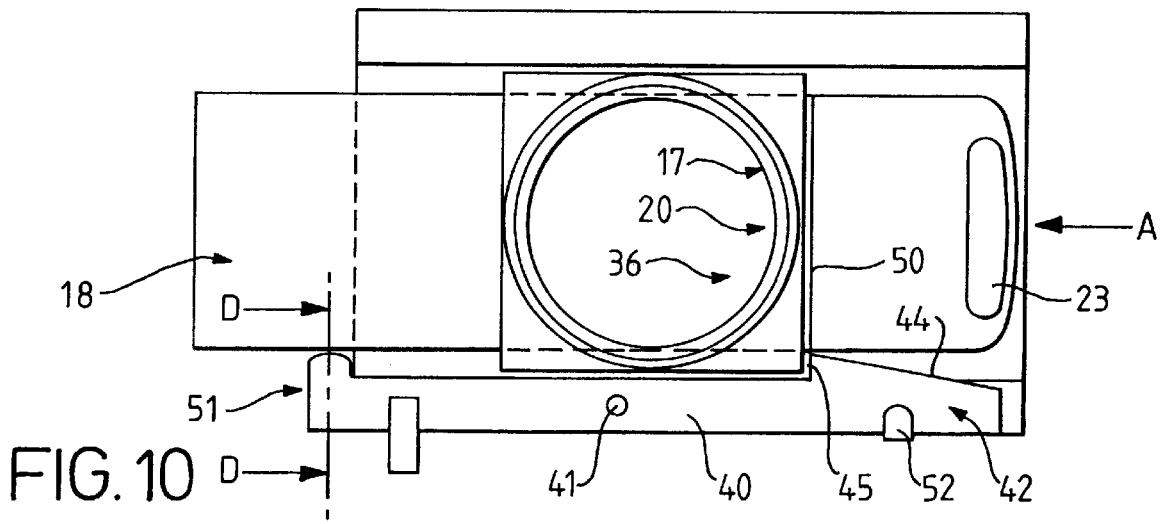
FIG. 10 is a top view of the dispensing device in dispensing operation.

FIGS. 9B and 10 illustrate the position when the carriage comes above the opening 36 of the hopper which corresponds to the delivery position. The latch head 42 moves inwards with its ramp surface 44 compressing the spring biased blocking element 21. Simultaneously, the second surface 45 of the latch head engages the transversally oriented side 860 of the container carriage to secure the container carriage in the delivery position. In this locking configuration, the gate plate can be released with respect to the container carriage since the blocking element 21 does no longer block on the sidewall of the carriage. Therefore, the plate gate can be moved in direction A by further exerting a pushing action on the handle 23 until the opening portion 19 of the plate gate is moved along the container carriage. The plate gate is stopped in place by abutting on the container carriage along transversal edge 50 when the opening 20 of the opening portion conforms to the openings 17 and 36. As a result of the motion of the gate plate, the container is opened and powder contained in the container can flow and fill the cavity of the hopper through the opening 36 of the hopper insert 35.

Figure 10A:
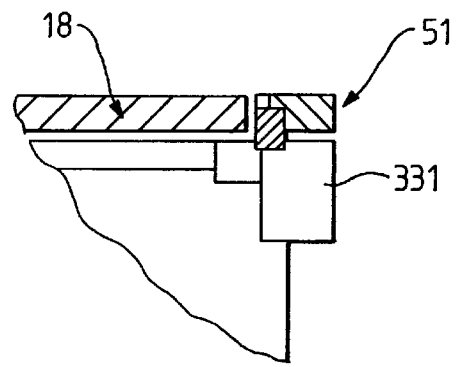
FIG. 10A shows a detail of the device along line D—D of FIG. 10.
Figure 10B:
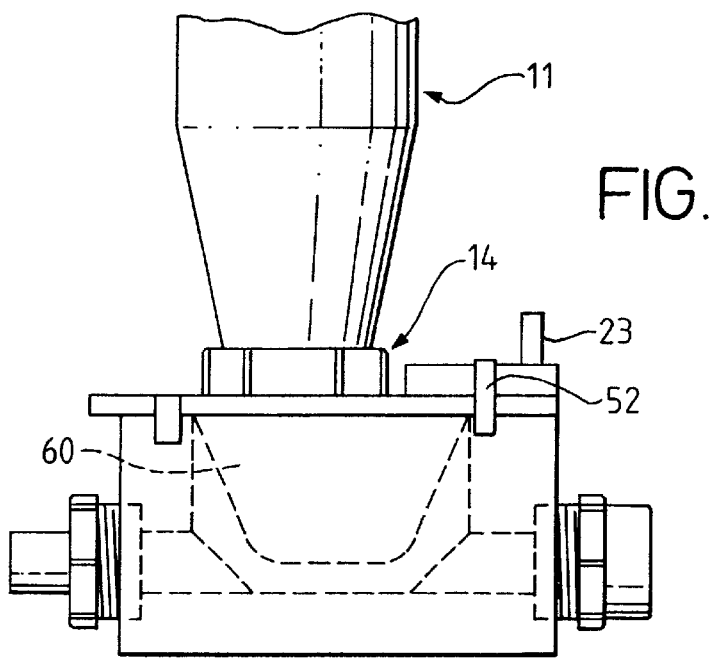
FIG. 10B is a side view of the dispensing device in the position according to FIG. 10.
Figure 11:
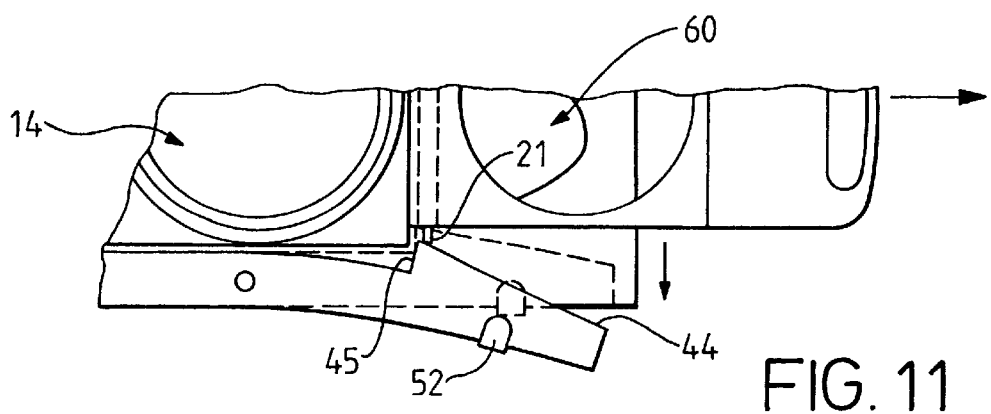
FIG. 11 shows a top view of a detail when unlocking the container holder to carry out removal of the container holding assembly.

In this delivery position with all the openings 17, 20, 36 being coincident one another, the latch mechanism 30 is securely locked in the configuration where it engages the container carriage so that the container carriage cannot be removed or moved backwards unless the plate gate is returned into a closed position; i.e., in which the obturating portion 18 replaces the opening portion 19 through the container carriage. For that, the container carriage is provided a secondary locking means 51 of the latch mechanism as better illustrated in FIG. 10A that engages the obturating part of the plate gate when in extended opening position along the loading area. As a result, the lever 40 is prevented from opening; i.e., rotating outwards, therefore keeping the container carriage in a secure position for delivery.

If one wants to remove the container holding assembly 12 from the reservoir assembly, for instance, for replacing the container by a new one, it is necessary to re-close the container carriage by pulling on the handle 23; i.e., exerting a pulling force in direction opposite to direction A, until the obturating portion 18 is sufficiently cleared from the blocking means 51 of the latch mechanism. The opening of the latch mechanism is further obtained by exerting a pulling action on the handling member 52 as particularly shown in FIG. 11 to disengage the engaging surface 45 from the transversal sidewall 860 of the container carriage. When the container carriage is released from the latch mechanism, the entire container assembly can be removed by further pulling on handle 23 while the container remains closed by the plate gate to prevent remaining powder from soiling the place.

As a further beneficial aspect of the invention, the cavity of the hopper means is shaped so as to provide an extended volume area 60 that extends beyond the hopper insert 35 so constituting a volume adapted for receiving an excess of flowable substance that is wiped when the gate plate is re-closed with respect to the container carriage. The extension of the volume is provided on the closure side of the container holder; i.e., on the side where the gate plate pulled back for closing the container carriage. Wiping of the powder may be obtained as a result of the powder which may be retained in the thickness of the opening 20 of the plate gate at the time the plate gate is actuated for re-closing. As a result of the extended cavity configuration, there is no risk of spilling powder outside of the reservoir.

As illustrated in FIGS. 7 and 8, the dosing means of the reservoir assembly 30 may be specifically designed to move the powder located in the extended cavity portion 37; i.e., in the front of the reservoir, faster than in the rest of the cavity; i.e., in the rear of the reservoir. For that, the auger comprises two distinct portions; a front portion of high volumetric displacement and a rear portion of comparatively lower volumetric displacement. A volumetric displacement screw 381 extends along the two portions while a means 381 for restricting the displaced volume of the screw is only placed in the lower volumetric displacement portion. Such a means may preferably be a solid insert occupying the internal volume of the volumetric displacement screw.

According to one important aspect of the invention, the reservoir assembly is of a limited storage capacity as compared to the capacity of the container. The container is intended to play the role of a storage extension of the reservoir it is operational on the reservoir. The assembly mechanism as described complies with the exigences of stability and safety necessary for this intended purpose.

Figure 12:
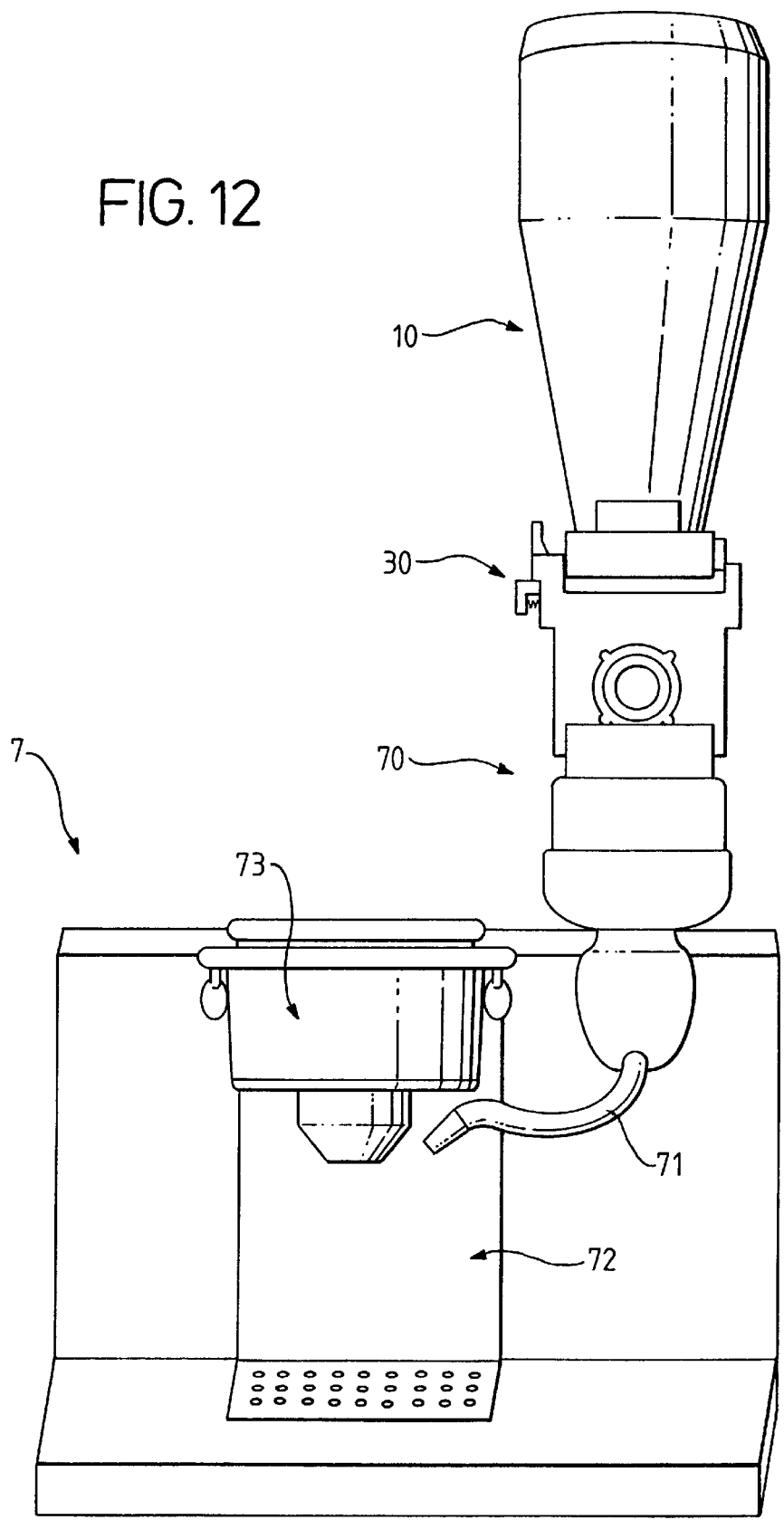
FIG. 12 illustrates an example of the dispensing device mounted on a home or office beverage coffee machine.

FIG. 12 illustrates a beverage-making machine that incorporates a dispensing device of the invention. The machine 7 includes the dispensing device 10, 30, shown in engaged position, which is connected to a mixing/whipping system 70. Pre-metered powder is dosed in the reservoir assembly 30 and delivered through outlet 39. The dose of powder falls in the bowl of the mixing/whipping system 70 a bowl and it is mixed with a pre-metered amount of hot water. The resulting mixture is dispensed through piping 71 to a dispensing area 72. The machine further comprises a unit for preparing coffee beverages from a brewing assembly 73 capable of making brewed coffee preparations. For instance, the container of the dispensing device would preferably contain milk powder that are added to the coffee preparations to allow cappuccino or latte beverages to be prepared.

The invention described and claimed herein is not strictly limited in scope by the specific embodiments herein disclosed. As a matter of example, the system has been described in the context of a horizontal loading. A vertical loading is also possible as an alternative delivery system. Any equivalent embodiments are intended to be within the scope of this invention. Indeed, various modifications of the invention will become apparent to those skilled in the art from the foregoing description. Such modifications are also intended to fall within the scope of the appended claims.

What is claimed is:

1. A device for dispensing a flowable substance comprising:

a container holding assembly adapted for receiving a container that includes a flowable substance therein, said container comprising:

opening means for selectively opening said container adapted to move from a closed position to an open position of the container and vice versa, and locking means for initially holding said opening means in the closed position of said container;

reservoir means adapted for retaining the container holding assembly thereon and for receiving flowable substance from the container when in a delivery position;

means for latching the reservoir means to the container holding assembly when the container is in the delivery position; and release means for releasing said locking means wherein said release means is coupled to said latch means and is capable of actuating the locking means when the container is in the delivery position so that the opening means is capable of being moved into an open position to allow flowable substance to flow from the container into the reservoir means.

2. A device according to claim 1, which further comprises a secondary locking means for locking said latch means for securing the container holding assembly to the reservoir means in the delivery position of the container, said secondary locking means being arranged with respect to the opening means of the container assembly so that it deactivates the latch means to release the container holding assembly only when the opening means is moved into a closed position of the container to prevent further flow of substance from the container into the reservoir means.

3. A device according to claim 1, wherein the container holding assembly comprises primary sliding means to move the opening means with respect to the container from a closed position to an opening position and vice versa.

4. A device according to claim 3, wherein the container holding assembly is guided in sliding engagement onto the reservoir means by secondary sliding engaging means that include stopping means capable of stopping the container from movement past the delivery position.

5. A device according to claim 4, wherein the primary and secondary sliding means lie in the same direction so that the engagement of the container assembly and the opening of the container can be carried out one after the other along a continuous sliding motion.

6. A device according to claim 1, wherein the handling means are operatively associated with the opening means such that movement of the handling means causes corresponding movement of the opening means between the open and closed positions.

7. A device according to claim 5, wherein the opening means and primary sliding means form a gate plate for slidably engaging a container carriage onto which the container is removably attached.

8. A device according to claim 7, wherein the container carriage supports a first part of the secondary sliding means adapted to complement a second part of the secondary sliding means of the reservoir means.

9. A device according to claim 7, wherein the gate plate and the container carriage have both openings that coincide together when the container holding assembly is moved to the opening position on the reservoir means.

10. A device according to claim 9, wherein the reservoir means comprises a passage for collecting the flowable substance that extends beyond the openings of the container assembly so that any excess of powder can be wiped from the gate plate during the closure of the gate plate with respect to the container carriage and collected through the passage.

11. A device according to claim 9, wherein said locking means of the container holding assembly is formed by a spring biased blocking element which locks the container carriage in a position in which the opening of the carriage is shut off by a solid closing portion of the gate plate.

12. A device according to claim 11, wherein said latch means of the reservoir means comprises a spring biased lever which has a first ramp surface that compresses the spring biased blocking element of the locking means in response to the sliding engagement of the opening means onto the reservoir means, thereby resulting in the release of the plate gate with respect of the container carriage.

13. A device according to claim 12, wherein said lever has a second surface extending with the first ramp surface, which second surface engages a portion of the container carriage for securely holding it in the delivery position.

14. A device according to claim 12, further comprising a secondary locking mechanism that includes a blocking surface arranged at the opposite side of the lever with respect to the ramp surface; whereby the gate plate is arranged to be engaged by the blocking surface when in open position for preventing the lever from opening and being capable of disengaging from the blocking surface when the gate plate is moved into its closed position with respect to the container carriage.

15. A device according to claim 1, wherein the reservoir means comprises a portion of hopper positioned and adapted to collect the substance as it flows through the container holding assembly.

16. A device according to claim 15, wherein the container, when opened, forms an extension of the hopper and wherein the container has a capacity larger than the capacity of the hopper.

17. A device according to claim 15, wherein the reservoir means comprises a dosing assembly located at the bottom of the hopper portion for dosing a predetermined amount of flowable substance transported by the dosing device toward an outlet of the hopper portion.

18. A device according to claim 17, wherein the dosing device comprises a rotary auger driven in rotation via an electrically powered motor.

19. A beverage dispensing device which includes a device according to claim 1 with the flowable substance being a powdered food or beverage.

20. A device according to claim 19, wherein the flowable substance is a milk or milk based product, soup, sauce, mashed potato or other dehydrated food product.

21. A container assembly comprising
a container containing a flowable substance; and
a container holding assembly adapted to be attached to the container which comprises an opening means for selectively opening said container adapted to move from a closed position to an open position of the container and vice versa, and locking means for holding said opening means in a closed position of said container; wherein said locking means is configured for operative association with release means of a reservoir assembly and is arranged so that release of the opening means from the locking means is effected when the container holding assembly is held in a stable delivery position upon the reservoir means.

22. A container assembly according to claim 21, wherein said container opening assembly further comprises a container carriage with a main opening onto which the container is attached by connection means and a gate plate slidably engaging the container carriage, wherein the locking means holds the container carriage in a non-delivery position in which the opening is obturated by the gate plate.

23. A container assembly according to claim 22, wherein said container holding assembly includes a handle for movement of the container carriage from the closed position to the open position when in delivery engagement in the reservoir means.

24. A container assembly according to claim 22, wherein the container carriage is removably connected to the container.

25. A container assembly according to claim 24, wherein the container carriage is connected to the container by screw threads or by a snap fitting connection.

26. A device for dispensing a flowable substance comprising:
   (i) a cartridge holder adapted for receiving a refill cartridge containing a flowable substance comprising an apertured plate member for selectively opening said cartridge, whereby said plate member is adapted to move from a closed position wherein a portion of the plate member obturates the cartridge to an open position of the container wherein the plate member leaves the cartridge open and vice versa, wherein the apertured plate member is initially locked to the cartridge in a closed position of the cartridge; and
   (ii) a hopper adapted to receive the cartridge holder in a delivery position for delivering the flowable substance from the cartridge, wherein the hopper is adapted to release the apertured plate member when the cartridge holder engages the hopper in the delivery position such that the cartridge holder is capable of being moved from the closed position to the open position thereby allowing flowable substance to flow from the cartridge into the hopper.

27. A device according to claim 26, wherein the cartridge is opened after the apertured plate is released by manually actuating the apertured plate into the open position.

28. A device according to claim 26, wherein the apertured plate is slidably connectable to the cartridge.

29. A device according to claim 26, wherein the cartridge is capable of being latched in a stable delivery position onto the hopper while the apertured plate is manually slid in the open position.

30. A device according to claim 27, wherein the cartridge is securely latched to hopper when the apertured plate is in open position and releasable only when the closed position of the apertured plate is restored.

31. A device according to claim 29, wherein the hopper has an extended volume area adapted to receive the flowable substance that is wiped when the apertured plate is moving to the closed position.

32. A device according to claim 26, wherein the flowable substance is a powdered food of beverage substance.

33. A device according to claim 26, wherein the refill cartridge has a capacity higher than the capacity of the hopper.

34. A device according to claim 26, wherein the hopper is adapted to dose the flowable substance to a mixing zone in order to prepare a beverage.

35. A device according to claim 26, wherein the hopper comprises a dosing screw adapted to move the flowable substance from the extended volume area in priority.

36. A device according to claim 26, wherein the hopper has sloped sidewalls forming an angle of between 15 to 30 degrees with respect to the direction of gravity.

37. A cartridge assembly comprising:
   a cartridge containing a food or beverage powder; and
   a cartridge holder adapted for receiving the cartridge comprising an apertured plate member for selectively opening said cartridge whereby said plate member is adapted to move from a closed position wherein a portion of the plate member obturates the cartridge to an open position of the container wherein the plate member leaves the cartridge open and vice versa, wherein the apertured plate member is locked to the cartridge in a closed position of the cartridge; and adapted to be released when engaged in a hopper adapted to receive the cartridge holder in a delivery position for delivering the flowable substance from the cartridge.

38. A method for rapidly and cleaningly delivering a powder in a reservoir assembly from a container containing a powder which comprises: providing a container holder adapted for receiving the container; said container holder comprising an apertured means for selectively opening said container whereby said apertured means is adapted to move from a closed position wherein a portion of the apertured means obturates the container to an open position of the container wherein the apertured means leaves the container open and vice versa, wherein the apertured means is locked to the container in a closed position of the container; and is released as resulting from the container holder securely engaging onto the reservoir assembly in a delivery position for delivering the flowable substance from the container.

39. The method according to claim 38, wherein the container is attached to the container holder before loading in the reservoir assembly as the container holder is in closed position by the apertured means.

40. The method according to claim 38, wherein the container holder is capable of being removed from the reservoir assembly only when the container is returned in closed position by the apertured means.

* * * * *